(12) United States Patent
Lu et al.

(10) Patent No.: US 11,346,946 B2
(45) Date of Patent: May 31, 2022

(54) THREE-DIMENSIONAL RECONSTRUCTION SYSTEM AND METHOD, MOBILE DEVICE, EYE PROTECTION METHOD, AR DEVICE

(71) Applicants: Beijing BOE Optoelectronics Technology Co., Ltd., Beijing (CN); BOE TECHNOLOGY GROUP CO., LTD., Beijing (CN)

(72) Inventors: Yuanjie Lu, Beijing (CN); Xuebing Zhang, Beijing (CN); Xi Li, Beijing (CN); Minglei Chu, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 777 days.

(21) Appl. No.: 16/102,532

(22) Filed: Aug. 13, 2018

(65) Prior Publication Data
US 2019/0204439 A1 Jul. 4, 2019

(30) Foreign Application Priority Data
Jan. 3, 2018 (CN) .......................... 201810005653.7

(51) Int. Cl.
*G01S 17/08* (2006.01)
*G01S 17/89* (2020.01)
*G01S 7/481* (2006.01)

(52) U.S. Cl.
CPC ............ *G01S 17/08* (2013.01); *G01S 7/4815* (2013.01); *G01S 17/89* (2013.01)

(58) Field of Classification Search
CPC .. H04N 13/296; H04N 13/207; H04N 13/204; H04N 13/254; G01S 17/89;
(Continued)

(56) References Cited

U.S. PATENT DOCUMENTS

2006/0070770 A1 4/2006 Marsh
2010/0290060 A1* 11/2010 Mohazzab ............ G01B 11/25
356/492
(Continued)

FOREIGN PATENT DOCUMENTS

CN 102397113 A 4/2012
CN 203941604 U 11/2014
(Continued)

OTHER PUBLICATIONS

Chinese Office Action dated Nov. 13, 2019, from application No. 201810005653.7.

*Primary Examiner* — Luke D Ratcliffe
(74) *Attorney, Agent, or Firm* — Thomas | Horstemeyer LLP

(57) ABSTRACT

A three-dimensional reconstruction system includes an infrared light source array including a plurality of infrared sub-light sources, and each of the infrared sub-light sources emitting an infrared light, and different infrared sub-light sources being coherent light sources, an infrared detector configured to receive an infrared light reflected from a target object, the reflected infrared light being a reflected light of an interference beam emitted by the coherent light source, a calculation circuit, configured to calculate a reference distance between a reflection point on the target object and the infrared sub-light source according to the reflected infrared light and the infrared light emitted by the infrared sub-light source, and a three-dimensional reconstruction circuit, configured to perform reconstruction of a three-dimensional image on the target object according to the plurality of reference distances.

16 Claims, 5 Drawing Sheets

(58) Field of Classification Search
CPC ........ G01S 17/894; G01S 7/486; G01S 17/10; G01S 7/4865; G01S 7/4816; G01S 7/484; G01S 17/08; G01S 7/4815
See application file for complete search history.

(56) References Cited

U.S. PATENT DOCUMENTS

| | | | |
|---|---|---|---|
| 2012/0194419 A1* | 8/2012 | Osterhout | G02B 27/017 345/156 |
| 2015/0077764 A1* | 3/2015 | Braker | G01S 7/4818 356/620 |
| 2015/0366457 A1* | 12/2015 | Dillon | A61B 5/0088 348/45 |

FOREIGN PATENT DOCUMENTS

| | | |
|---|---|---|
| CN | 104635237 A | 5/2015 |
| CN | 105118247 A | 12/2015 |
| CN | 205448962 U | 8/2016 |
| CN | 106325509 A | 1/2017 |
| CN | 205862542 U | 1/2017 |
| CN | 106448086 A | 2/2017 |
| CN | 106846473 A | 6/2017 |
| CN | 107003391 A | 8/2017 |

\* cited by examiner

THREE-DIMENSIONAL RECONSTRUCTION SYSTEM AND METHOD, MOBILE DEVICE, EYE PROTECTION METHOD, AR DEVICE

CROSS REFERENCE

The present application claims the priority of Chinese Patent Application No. 201810005653.7, and filed on Jan. 3, 2018, and the entire contents thereof are incorporated herein by reference to serve as a portion of the present application.

TECHNICAL FIELD

The present disclosure relates to the field of three-dimensional information technology, and in particular, to a three-dimensional reconstruction system and method, a mobile device with an eye protection function, an eye protection method applied to a mobile device, and an AR device.

BACKGROUND

With the rapid development of mobile communication technologies, the application of mobile devices such as mobile phones is becoming more and more widespread, and the diversified functions of smart devices are more attractive to consumers. However, excessive immersion in the mobile phone or incorrect posture of using the mobile phone will cause great damage to the eyes, such as easily causing visual fatigue or accelerating myopia. Therefore, in the process of using mobile phones, it is very important to remind consumers to use mobile phones properly and correctly.

It should be noted that, information disclosed in the above background portion is provided only for better understanding of the background of the present disclosure, and thus it may contain information that does not form the prior art known by those ordinary skilled in the art.

SUMMARY

According to some arrangements of the present disclosure, a three-dimensional reconstruction system includes an infrared light source array, including a plurality of infrared sub-light sources, and each of the infrared sub-light sources emitting an infrared light, and different infrared sub-light sources being coherent light sources, an infrared detector, configured to receive an infrared light reflected from a target object, the reflected infrared light is a reflected light of an interference beam emitted by the coherent light source, a calculation circuit, configured to calculate a reference distance between a reflection point on the target object and the infrared sub-light source according to the reflected infrared light and the infrared light emitted by the infrared sub-light source, and a three-dimensional reconstruction circuit, configured to perform reconstruction of a three-dimensional image on the target object according to the plurality of reference distances.

In an exemplary arrangement of the present disclosure, the three-dimensional reconstruction system further includes a light source control circuit, configured to control each of the infrared sub-light sources to emit an infrared light of a preset phase, such that the interference light beam is enhanced in a target region on the target object and weakened in a non-target region on the target object or beyond the target object.

In an exemplary arrangement of the present disclosure, the interference beam is enhanced at the reflection point.

In an exemplary arrangement of the present disclosure, the infrared light source array further includes a collimating lens disposed at a light emitting side of the infrared sub-light source.

In an exemplary arrangement of the present disclosure, the infrared detector includes an infrared photosensitive device.

In an exemplary arrangement of the present disclosure, the three-dimensional reconstruction circuit obtains the reference distance between each location of the target object and the infrared sub-light source by traversing all locations of the target object, to perform reconstruction of the three-dimensional image on the target object according to the plurality of reference distances.

According to some arrangements of the present disclosure, a three-dimensional reconstruction method includes emitting coherent infrared lights by using a plurality of infrared sub-light sources in an infrared light source array, and different infrared sub-light sources being coherent light sources, receiving an infrared light reflected from a target object by using an infrared detector, the reflected infrared light is a reflected light of an interference beam emitted by the coherent light source, calculating a reference distance between a reflection point on the target object and the infrared sub-light source according to the reflected infrared light and the infrared light emitted by the infrared sub-light source, and performing reconstruction of a three-dimensional image on the target object according to the plurality of reference distances.

In an exemplary arrangement of the present disclosure, the emitting coherent infrared lights by using a plurality of infrared sub-light sources in an infrared light source array includes controlling each of the infrared sub-light sources in the infrared light source array to emit an infrared light of a preset phase, such that the interference light beam is enhanced in a target region on the target object and weakened in a non-target region on the target object or beyond the target object.

In an exemplary arrangement of the present disclosure, the interference beam is enhanced at the reflection point.

In an exemplary arrangement of the present disclosure, the three-dimensional reconstruction method further includes using a collimating lens to convert the infrared light emitted from the infrared sub-source into a plane wave.

In an exemplary arrangement of the present disclosure, the infrared detector includes an infrared photosensitive device.

According to some arrangements of the present disclosure, a mobile device having an eye protection function includes the above three-dimensional reconstruction system, a processing circuit, and a warning circuit, the three-dimensional reconstruction system obtaining a three-dimensional image of a human face according to a reference distance between a plurality of reflection points of the human face and an infrared sub-light source, the processing circuit acquiring a relative position relationship between a human eye and a mobile device based on the three-dimensional image of the human face and determining whether the relative position relationship satisfies a preset result, the warning circuit issuing a prompt when the relative position relationship between the human eye and the mobile device satisfies the preset result.

In an exemplary arrangement of the present disclosure, the preset result includes: a distance between the human eye and the mobile device is less than a preset distance; or an angle between the human eye and the mobile device is greater than a preset angle.

According to some arrangements of the present disclosure, an eye protection method applied to a mobile device includes obtaining a three-dimensional image of a human face according to a reference distance between a plurality of reflection points of a human face and an infrared sub-light source by using the above three-dimensional reconstruction method, acquiring a relative position relationship between a human eye and a mobile device based on the three-dimensional image of the human face, and issuing a prompt when the relative position relationship between the human eye and the mobile device satisfies a preset result.

In an exemplary arrangement of the present disclosure, the preset result includes: a distance between the human eye and the mobile device is less than a preset distance; or an angle between the human eye and the mobile device is greater than a preset angle.

According to some arrangements of the present disclosure, there is provided an augmented reality AR device, including the above three-dimensional reconstruction system.

It is to be understood that the foregoing general description and the following detailed description are exemplary and explanatory only and are not restrictive of the present disclosure.

BRIEF DESCRIPTION OF THE DRAWINGS

The accompanying drawings herein are incorporated in and constitute a part of this specification, illustrate arrangements consistent with the present disclosure, and together with the description serve to explain the principles of the present disclosure. Apparently, the accompanying drawings in the following description show merely some arrangements of the present disclosure, and those skilled in the art may also obtain other drawings from these accompanying drawings without creative efforts.

DETAILED DESCRIPTION

Figure 1:
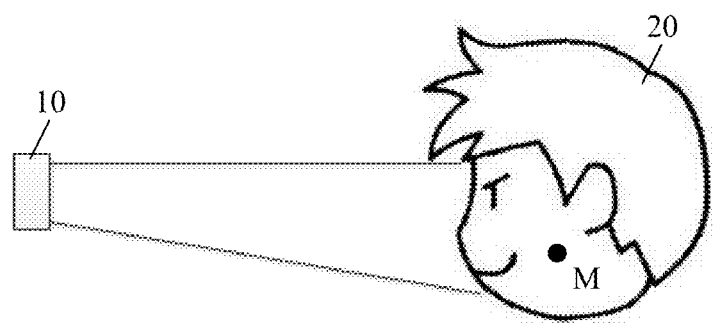
FIG. 1 schematically shows an application architecture diagram of a three-dimensional reconstruction system in an exemplary arrangement of the present disclosure.

Example arrangements will now be described more fully with reference to the accompanying drawings. However, example arrangements can be implemented in various forms and should not be construed as limited to the examples set forth herein; rather, these arrangements are provided so that this disclosure will be more complete and complete, and will fully convey the concept of the example arrangements. For those skilled in the art. The features, structures, or characteristics described may be combined in any suitable manner in one or more arrangements.

Moreover, the drawings are merely schematic illustrations of the present disclosure and are not necessarily drawn to scale. The same reference numerals in the drawings denote the same or similar parts, and their repeated description will be omitted. Some of the block diagrams shown in the figures are functional entities and do not necessarily have to correspond to physically or logically independent entities. These functional entities may be implemented in software, or implemented in one or more hardware modules or integrated circuits, or implemented in different network and/or processor devices and/or microcontroller devices.

Three-dimensional reconstruction technology includes the establishment of a mathematical model of a three-dimensional object suitable for computer representation and processing. It is the basis for processing, operating, and analyzing the nature of the three-dimensional object under computer environment, and is also a key technology for establishing virtual reality in the computer to express the objective world. In the related art, the three-dimensional reconstruction method can generally be implemented in following two manners. In a first manner, a handheld three-dimensional scanning apparatus consisting of a line laser projector, a camera, and an external auxiliary positioning apparatus is used to achieve three-dimensional scanning and reconstruction through an external auxiliary positioning apparatus for laser tracking or wireless positioning indoors, but a volume of the apparatus is large. In a second manner, a mobile phone with a rear camera and a mini projector is used to achieve three-dimensional scanning and reconstruction through a plurality of projected structure light beams, but the cost of the apparatus is high.

Based on this, as shown in FIG. 1, this exemplary arrangement provides a three-dimensional reconstruction system 10 that can be used to reconstruct a three-dimensional image of a target object 20. The three-dimensional reconstruction system 10 provided in this arrangement has the advantages of small size and low cost, and therefore can be applied to mobile devices such as mobile phones, AR (Augmented Reality) devices, and VR (Virtual Reality) devices.

Figure 2:
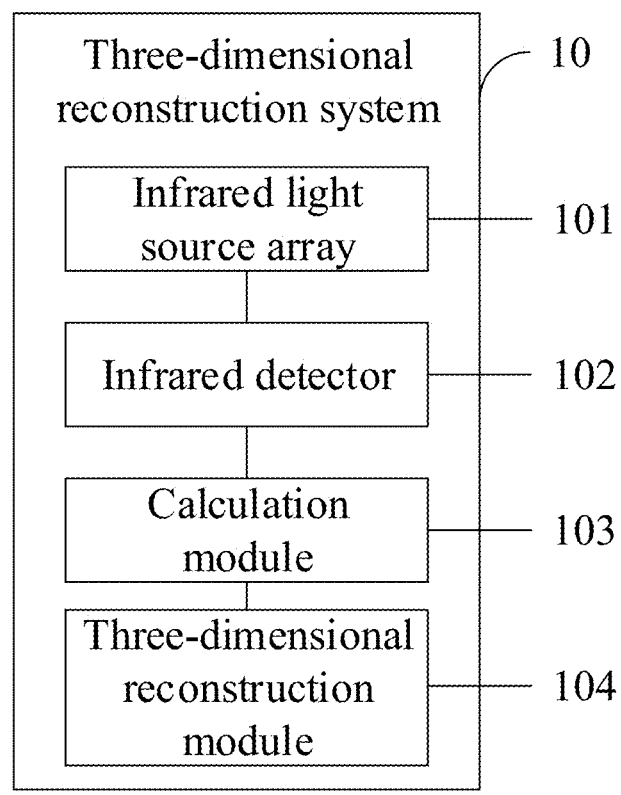
FIG. 2 schematically shows a first functional block diagram of a three-dimensional reconstruction system in an exemplary arrangement of the present disclosure.
Figure 3:
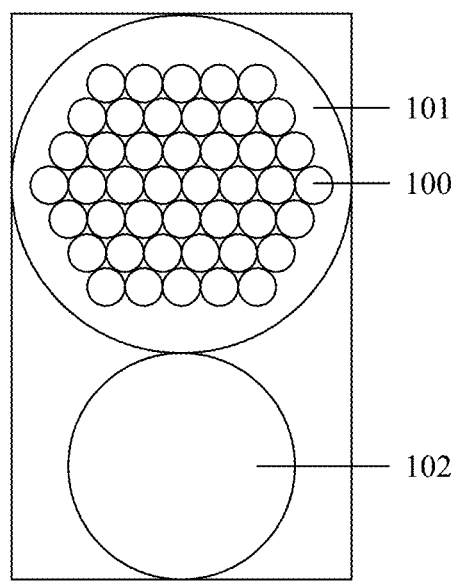
FIG. 3 schematically shows a working principle diagram of a three-dimensional reconstruction system in an exemplary arrangement of the present disclosure.

FIG. 2 is a functional block diagram of a three-dimensional reconstruction system 10 provided in the present exemplary arrangement. As can be seen from the figure, the three-dimensional reconstruction system 10 may mainly include:

an infrared light source array 101, which may include a plurality of infrared sub-light sources 100, and each of the infrared sub-light sources 100 emitting an infrared light, and different infrared sub-light sources 100 being coherent light sources, that is, the plurality of infrared sub-light sources 100 may emit coherent infrared light;

an infrared detector 102, which may receive an infrared light reflected from a target object, the reflected infrared light is a reflected light of an interference beam emitted by the coherent light source at a certain point of the target object;

a calculation module 103, which may calculate a reference distance between a reflection point on the target object and the infrared sub-light source 100 according to the reflected infrared light and the infrared light emitted by the infrared sub-light source 100; and a three-dimensional reconstruction module 104, which may perform reconstruction of a three-dimensional image on the target object according to the reference distance between a plurality of reflection points and the infrared sub-light source 100.

In the arrangement, the reference distance between a plurality of reflection points and the infrared sub-light source 100 should include the distance information of as many reflection points as possible, so as to obtain a high-precision three-dimensional reconstruction image.

It should be noted that, the reflection point may be a position where a surface of the target object receives and reflects the interference light beam of the infrared light, and the position is the brightness enhancement point of the interference light beam.

It should also be understood that the "modules" referred to in the present disclosure, such as the calculation module 103, the three-dimensional reconstruction module 104 and the like, may be physical modules composed of corresponding circuits or the like. For example, the calculation module 103 may include a corresponding operation circuit and/or a correspondingly formulated integrated circuit (IC) or the like. Alternatively, these modules may also be implemented by software modules that perform corresponding operations, for example, may include corresponding applications. For example, the calculation module 103 may include application program codes that cause the computer system to perform corresponding operations when run on a computer system (e.g., a central processor). Other "modules" of the present disclosure may also be configured in a similar manner and will not be described in detail below.

In the three-dimensional reconstruction system 10 provided by the exemplary arrangement of the present disclosure, different points of the target object 20 are illuminated by the multi-light source interference method, and the reflected light received by the infrared detector 102 is the reflected light of a certain point on the surface of the target object 20. Since different points have different distances to the infrared sub-light source 100, the three-dimensional image information can be obtained by traversing all locations of the target object 20 through this method, thus realizing the reconstruction of the three-dimensional image of the target object 20. For example, all the target points on the target object 20 may be scanned in a row-by-row or column-by-column manner, thus completing the traversing of all the target points. After obtaining the depth information of all the positions, the depth information may be used to determine the coordinates of all points on the target for reconstructing the 3D image. On one hand, the three-dimensional reconstruction system 10 uses light interference to achieve distance detection of different points, and its technical difficulty is relatively low. On the other hand, the phase difference of coherent light is used to achieve the scanning of the target object, the structure is simple and the response time of the mechanical rotation is also reduced compared with mechanical scanning. On another hand, the infrared detector 102 is used to detect the light intensity, which does not need to use a high-resolution sensor or camera, so the cost is reduced.

Figure 4:
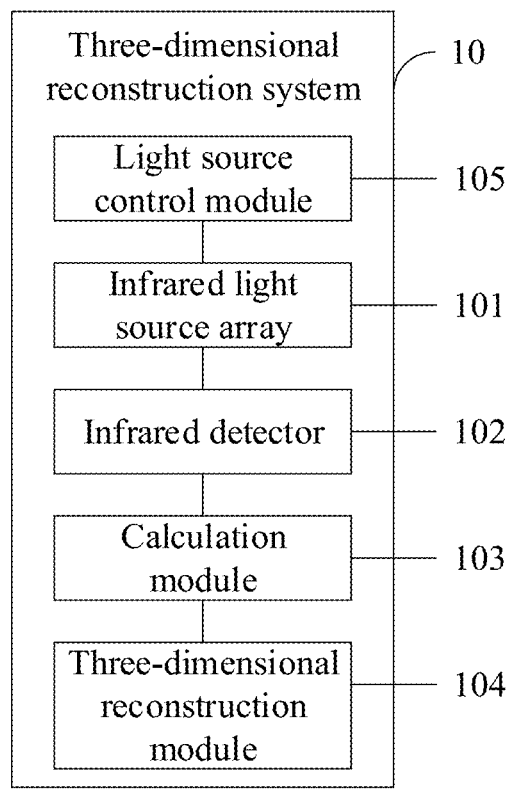
FIG. 4 schematically shows a second functional block diagram of a three-dimensional reconstruction system in an exemplary arrangement of the present disclosure.

Based on the above three-dimensional reconstruction system, taking into account the need to control and adjust the phase of the infrared light emitted by each infrared sub-light source 100, as shown in FIG. 4, the three-dimensional reconstruction system 10 may include:

a light source control module 105, configured to control each of the infrared sub-light sources 100 to emit an infrared light of a preset phase, in this way, the interference light beam is enhanced in a target region M on the target object and weakened in a non-target region on the target object or beyond the target object.

In the arrangement, referring to FIG. 1, the target region M refers to a part that needs to acquire distance information during each scanning process. In this arrangement, the target region M is selected as a point on the target object 20, and the point is a reflection point of the interference beam.

According to the present disclosure, the phase control of the light source can be achieved using an electro-optic modulator. The electro-optic modulator is made according to the electro-optical effect of lithium niobate ($LiNbO_3$). Electro-optic modulation is based on the linear electro-optical effect (Pulke effect), that is, the effect that the refractive index of an optical waveguide is proportional to an applied electric field. The linear change in the refractive index of the optical waveguide in the phase modulator caused by the electro-optic effect causes phase shift of the optical wave passing through the waveguide, thus realizing phase modulation.

In this way, by adjusting the phase of the infrared light emitted by each infrared sub-light source 100, it is possible to purposely control the interference beam to illuminate only a target region M of the target object 20, such as a certain point. At this time, the reflected light received by the infrared detector 102 is the reflected light of this point, and the calculated reference distance is also the distance between this point and the infrared sub-light source 100.

In this exemplary arrangement, the infrared light source array 101 may further include a collimating lens disposed at a light emitting side of the infrared sub-light source 100. In this way, the infrared light emitted from the infrared light source 100 can be converted into a plane wave, thus simplifying the processing.

In the present exemplary arrangement, the infrared detector 102 may be an infrared sensor. In this arrangement, the infrared detector 102 may include only an infrared light-sensing device, which corresponds to completely discarding the optical structure of the infrared camera, and therefore the volume is small. In addition, in this arrangement, the depth information is obtained by using the reflected light of the interference light beam of the infrared array light source, and it is possible to perform the measurement using only an ordinary photosensitive element. Therefore, the requirement for the resolution of the infrared light-sensitive device is low, the cost may be effectively reduced.

In this arrangement, the phase of the coherent light is adjusted to accurately measure the distance of a certain point, and then the distance information within the entire angle of view is obtained, thus which may achieve the measurement on any point at any time. The use is more convenient and flexible, and the viewing angle may reach 120°.

Figure 5:
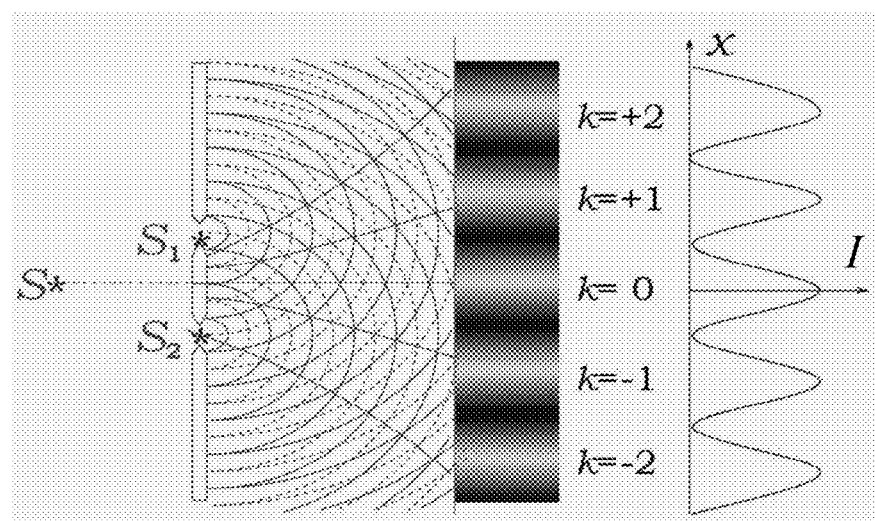
FIG. 5 schematically shows an experimental schematic diagram of dual beam interference in an exemplary arrangement of the present disclosure.

The distance detection principle in this example will be described below with reference to FIG. 5 by taking two-beam interference as an example. The two coherent light beams S1 and S2 interfere with one another during spatial propagation and are superimposed on each other, thus forming an enhancement zone and an attenuation zone of the light intensity, such as the bright and dark stripes in the Young's double-slit experiment.

In the case of two-beam interference, the light intensity at any point in space can be calculated by the following formula:

$$I(r)=I_1+I_2+2\times[(I_1\times I_2)\cos(\theta_1-\theta_2)]^2$$

I(r) is the light intensity at a r point after the interference superposition, $I_1$ and $I_2$ are intensities of the two beams respectively, and $\theta_1$ and $\theta_2$ are phases of the two beams respectively.

The light intensity value I depends on the phase difference $(\theta_1-\theta_2)$ on the premise that the light intensity of the two light sources is constant. When the phase difference is 0°, the light intensity I is the maximum value; when the phase difference is 180°, the light intensity I is the minimum value. In particular, when $I_1=I_2$ and the phase difference is 180°, the light intensity I is 0, which is equivalent to a dark area without illumination.

It can be seen that whether the light intensity at the r point is increased or decreased can be determined by the phase difference between the two light beams that interfere. On this basis, the effect of multi-beam interference will be further better, that is, the interference superposition of a plurality of beams will make the light intensity in most regions of the space to be zero after superimposed, and the light intensity in a specific region will be enhanced after superimposed, thus achieving illumination of a specific small region. Since the distance from the region where the light intensity increases to the light source is constant when the coherent light interferes, the distance between the point and the light source can be obtained by illuminating a certain point of the target object through the multi-beam interference method.

The case of dual light sources is described in this arrangement, however it should be understood that if the number of light sources is small (e.g., in the case of dual light sources), it is not possible to illuminate only one bright area in the field of view. Illuminating a single bright area requires that light from a plurality of differently phased light sources be superimposed on each other in space, and thus various arrangements of the present disclosure use an array of light sources to emit multiple beams of coherent light.

Based on the above explanation, the phase of each light source can be controlled such that the bright area of the illumination passes through various positions of the field of view of the photodetector, and the depth information detection in the field of view of the photodetector is realized.

Figure 6:
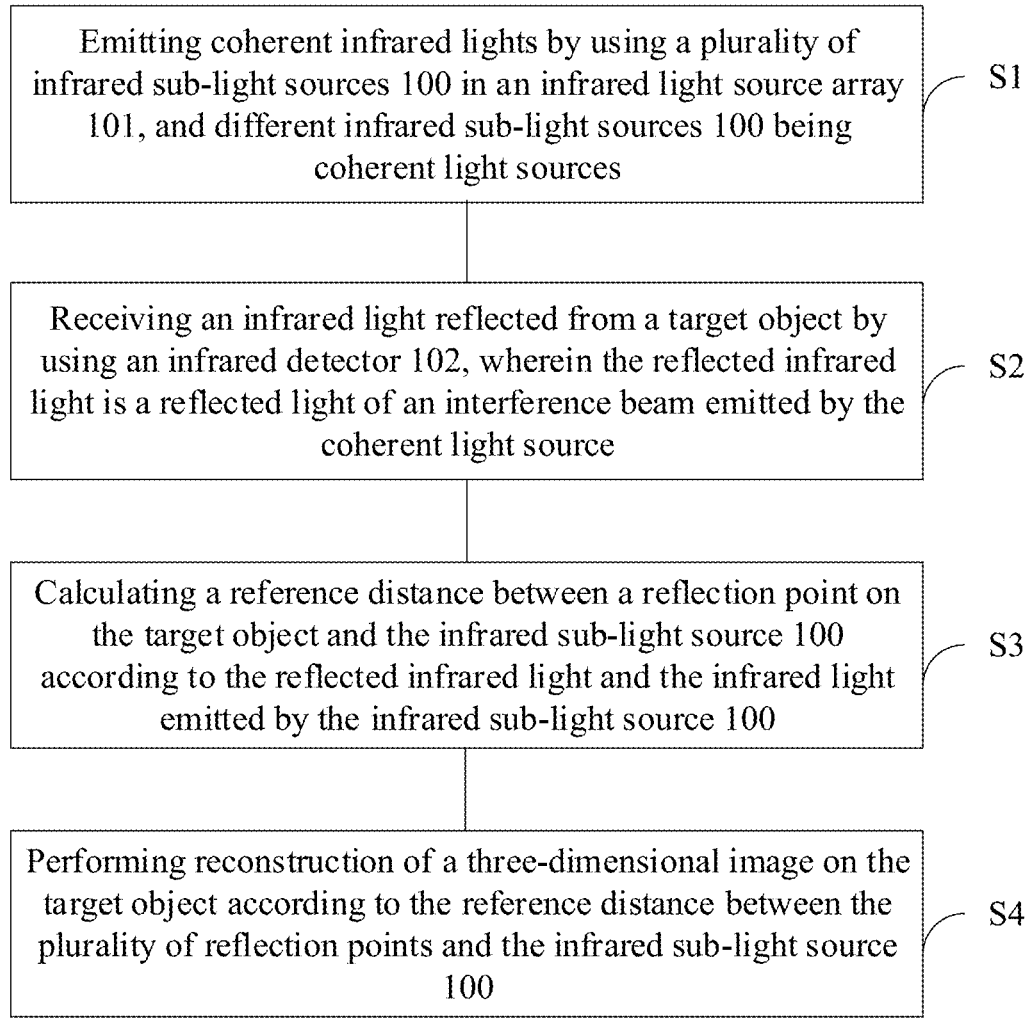
FIG. 6 schematically shows a flowchart of a three-dimensional reconstruction method in an exemplary arrangement of the present disclosure.

Correspondingly, this exemplary arrangement further provides a three-dimensional reconstruction method that can be used to reconstruct the three-dimensional image of the target object 20. As shown in FIG. 6, the three-dimensional reconstruction method may include:

S1, emitting coherent infrared lights by using a plurality of infrared sub-light sources 100 in an infrared light source array 101, and different infrared sub-light sources 100 being coherent light sources;

S2, receiving an infrared light reflected from a target object by using an infrared detector 102, the reflected infrared light is a reflected light of an interference beam emitted by the coherent light source;

S3, calculating a reference distance between a reflection point on the target object and the infrared sub-light source 100 according to the reflected infrared light and the infrared light emitted by the infrared sub-light source 100; and S4, performing reconstruction of a three-dimensional image on the target object according to the reference distance between the plurality of reflection points and the infrared sub-light source 100.

In the arrangement, the reference distance between a plurality of reflection points and the infrared sub-light source 100 should include the distance information of as many reflection points as possible, so as to obtain a high-precision three-dimensional reconstruction image.

In the three-dimensional reconstruction method provided by the exemplary arrangement of the present disclosure, different points of the target object 20 are illuminated by the multi-light source interference method, and the reflected light received by the infrared detector 102 is the reflected light of a certain point on the surface of the target object 20. Since different points have different distances to the infrared sub-light source 100, the three-dimensional image information can be obtained by traversing all locations of the target object 20 through this method, thus realizing the reconstruction of the three-dimensional image of the target object 20. On one hand, the three-dimensional reconstruction system 10 uses light interference to achieve distance detection of different points, and its technical difficulty is relatively low. On the other hand, the phase difference of coherent light is used to achieve the scanning of the target object, the structure is simple and the response time of the mechanical rotation is also reduced compared with mechanical scanning. On another hand, the infrared detector 102 is used to detect the light intensity, and it is unnecessary to use a high-resolution sensor or camera, so the cost is reduced.

Based on the above three-dimensional reconstruction method, when the coherent infrared lights are emitted by using a plurality of infrared sub-light sources 100 in an infrared light source array 101, a light source control module 105 can also be provided to control each of the infrared sub-light sources 100 in the infrared light source array 101 to emit an infrared light of a preset phase, so that the interference light beam is enhanced in a target region M on the target object and weakened in a non-target region on the target object or beyond the target object. In this way, it is possible to purposely control the interference beam to illuminate only a certain point of the target object 20, and then the calculated reference distance is the distance between this point and the infrared sub-light source 100.

It should be noted that the specific details of the three-dimensional reconstruction method have been described in detail in the corresponding three-dimensional reconstruction system, and will not be described herein.

Based on the above-mentioned three-dimensional reconstruction system and method, taking into account its advantages such as low technical difficulty, simple structure, compact size, low cost and the like, the present exemplary arrangement further provides a mobile device applying the three-dimensional reconstruction system and method to achieve an eye protection function.

FIG. 6 is a block diagram of a mobile device with an eye protection function according to an exemplary arrangement. As can be seen from the figure, the mobile device may include the above-described three-dimensional reconstruction system 10, a processing module 30, and a warning module 40. In this case, referring to FIG. 1, the target object 20 is a face of the user of the mobile device.

Specifically, the three-dimensional reconstruction system 10 may obtain a three-dimensional image of a human face according to a reference distance between a plurality of reflection points of the human face and an infrared sub-light source 100; the processing module 30 may acquire a relative position relationship between a human eye and a mobile device based on the three-dimensional image of the human face and determine whether the relative position relationship satisfies a preset result; the warning module 40 may issue a prompt when the relative position relationship between the human eye and the mobile device satisfies the preset result. In the arrangement, for example, the preset result may include: a distance between the human eye and the mobile device is less than a preset distance; or an angle between the human eye and the mobile device is greater than a preset angle. In the present disclosure, when the human eye is directly facing the mobile device (or the human eye is in a normal use position relative to the mobile device), the angle between the human eye and the mobile device can be defined as 0 (zero) degree. Accordingly, the angle between the human eye and the mobile device may be the angle at which the human eye deviates from the zero-degree position.

In this way, in the present exemplary arrangement, the entire face of the user of the mobile device can be scanned by using the three-dimensional reconstruction system 10, so as to restore facial information of the user. Since the brightness enhancement region where a plurality of light beams interfere, that is, the region of the light spot projects, is controlled by the phase of different infrared lights, the processing module 30 has acquired position relationships of all parts of the face relative to the mobile device while restoring the user's facial information and determined whether the relative position relationship satisfies a preset result. Based on this, the warning module 40 can prompt the user of the mobile device that the device is too close to the eye or the device is not directly in front of the eye when the relative position relationship satisfies a preset result, thus preventing eye problems such as myopia or eyeball skew, to protect the user's eyes.

Figure 7:
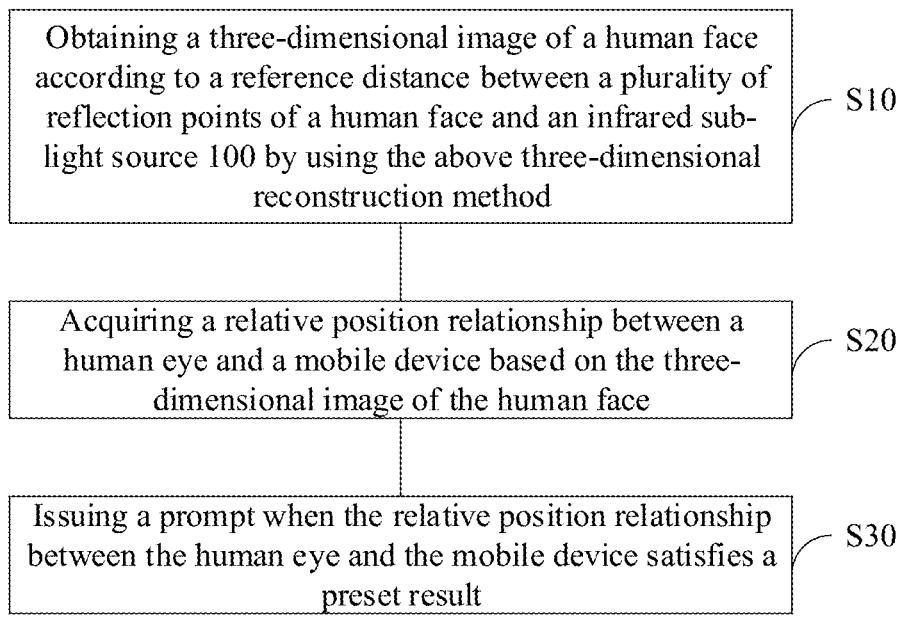
FIG. 7 schematically shows a flowchart of an eye protection method applied to a mobile device in an exemplary arrangement of the present disclosure.

Correspondingly, this exemplary arrangement further provides an eye protection method applied to a mobile device. As shown in FIG. 7, the eye protection method may include:

S10, obtaining a three-dimensional image of a human face according to a reference distance between a plurality of reflection points of a human face and an infrared sub-light source 100 by using the above three-dimensional reconstruction method;

S20, acquiring a relative position relationship between a human eye and a mobile device based on the three-dimensional image of the human face; and S30, issuing a prompt (e.g., a prompt tone) when the relative position relationship between the human eye and the mobile device satisfies a preset result.

In the arrangement, for example, the preset result may include: a distance between the human eye and the mobile device is less than a preset distance; or an angle between the human eye and the mobile device is greater than a preset angle.

In this way, in the present exemplary arrangement, the entire face of the user of the mobile device can be scanned by using the three-dimensional reconstruction method, so as to restore facial information of the user. Since the brightness enhancement region where a plurality of light beams interfere, that is, the region of the light spot projects, is controlled by the phase of different infrared lights, position relationships of all parts of the face relative to the mobile device has been acquired while the user's facial information is restored and it is determined whether the relative position relationship satisfies a preset result. Based on this, the user of the mobile device is prompted that the device is too close to the eye or the device is not directly in front of the eye when the relative position relationship satisfies a preset result, thus preventing eye problems such as myopia or eyeball skew, to protect the user's eyes.

This exemplary arrangement further provides an AR device, including the above-described three-dimensional reconstruction system 10. The three-dimensional reconstruction system 10 can realize accurate spatial three-dimensional reconstruction, thus providing a basis for projecting the superimposed image.

This exemplary arrangement further provides an AR device, including the above-described three-dimensional reconstruction system 10. The three-dimensional reconstruction system 10 can realize accurate spatial three-dimensional reconstruction, thus providing a basis for projecting the superimposed image.

It should be noted that, although several modules or units of the device for action execution are mentioned above in detail, this division is not mandatory. In fact, according to the arrangements of the present disclosure, the features and functions of two or more modules or units described above may be embodied in one module or unit. Conversely, the features and functions of one module or unit described above may be further divided into a plurality of modules or units to be employed.

In addition, although various blocks of the methods of the present disclosure are described in the drawings in a particular order, this does not require or imply that the blocks must be performed in that particular order, or does not require or imply that all of the illustrated blocks must be performed to achieve the desired result. Additionally or alternatively, certain blocks may be omitted, a plurality of blocks may be combined into one block, and/or one block may be divided into a plurality of blocks to perform.

Other arrangements of the present disclosure will readily occur to those skilled in the art upon consideration of the specification and practice of the invention disclosed herein. The present application is intended to cover any variations, uses, or adaptations of the present disclosure that follow general principles of the present disclosure and include common knowledge or conventional technical means in the art which are not disclosed herein. The specification and arrangements are considered as exemplary only, with the true scope and spirit of the present disclosure being indicated by the appending claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A three-dimensional reconstruction system, comprising:
    an infrared light source array comprising a plurality of infrared sub-light sources, and each of the infrared sub-light sources emitting an infrared light, and different infrared sub-light sources being coherent light sources;
    an infrared detector configured to receive an infrared light reflected from a target object, wherein the reflected infrared light is a reflected light of an interference beam emitted by the coherent light sources;
    a calculation circuit configured to calculate a plurality of reference distances between a reflection point on the target object and the infrared sub-light sources according to the reflected infrared light and the infrared light emitted by the infrared sub-light sources;
    a three-dimensional reconstruction circuit configured to perform a reconstruction of a three-dimensional image on the target object according to the plurality of reference distances; and
    a light source control circuit configured to control each of the infrared sub-light sources to emit an infrared light of a preset phase such that the interference beam is enhanced in a target region on the target object and weakened to be zero in a non-target region on the target object or beyond the target object.

2. The three-dimensional reconstruction system according to claim 1, wherein the interference beam is enhanced at the reflection point.

3. The three-dimensional reconstruction system according to claim 1, wherein the infrared light source array further comprises a collimating lens disposed at a light emitting side of the infrared sub-light sources.

4. The three-dimensional reconstruction system according to claim 1, wherein the infrared detector comprises an infrared photosensitive device.

5. The three-dimensional reconstruction system according to claim 1, wherein the three-dimensional reconstruction circuit is further configured to obtain the reference distance between each location of the target object and the infrared sub-light source by traversing all locations of the target object to perform a reconstruction of the three-dimensional image on the target object according to the plurality of reference distances.

6. A three-dimensional reconstruction method, comprising:
    emitting coherent infrared lights using a plurality of infrared sub-light sources in an infrared light source array, and different infrared sub-light sources being coherent light sources, wherein emitting the coherent infrared lights using the plurality of infrared sub-light sources in the infrared light source array comprises controlling each of the infrared sub-light sources in the infrared light source array to emit an infrared light of a preset phase such that an interference beam emitted by the coherent light sources is enhanced in a target region on an target object and weakened to be zero in a non-target region on the target object or beyond the target object;
    receiving an infrared light reflected from the target object using an infrared detector, wherein the reflected infrared light is a reflected light of the interference beam emitted by the coherent light sources;
    calculating a plurality of reference distances between a reflection point on the target object and the infrared sub-light sources according to the reflected infrared light and the infrared light emitted by the infrared sub-light sources; and
    performing reconstruction of a three-dimensional image on the target object according to the plurality of reference distances.

7. The three-dimensional reconstruction method according to claim 6, wherein the interference beam is enhanced at the reflection point.

8. The three-dimensional reconstruction method according to claim 6, further comprising using a collimating lens to convert the infrared light emitted from the infrared sub-light sources into a plane wave.

9. The three-dimensional reconstruction method according to claim 6, wherein the infrared detector comprises an infrared photosensitive device.

10. A mobile device having an eye protection function, comprising:
    a three-dimensional reconstruction system, a processing circuit, and a warning circuit, wherein the three-dimensional reconstruction system comprises:
        an infrared light source array comprising a plurality of infrared sub-light sources, each of the infrared sub-light sources emitting an infrared light, and different infrared sub-light sources being coherent light sources;
        an infrared detector configured to receive an infrared light reflected from a target object, wherein the reflected infrared light is a reflected light of an interference beam emitted by the coherent light sources;
        a calculation circuit configured to calculate a plurality of reference distances between a reflection point on the target object and the infrared sub-light sources according to the reflected infrared light and the infrared light emitted by the infrared sub-light sources;
        a three-dimensional reconstruction circuit configured to perform a reconstruction of a three-dimensional image on the target object according to the plurality of reference distances; and
        a light source control circuit configured to control each of the infrared sub-light sources to emit an infrared light of a preset phase such that the interference beam is enhanced in a target region on the target object and weakened to be zero in a non-target region on the target object or beyond the target object;
    the three-dimensional reconstruction system being configured to obtain a three-dimensional image of a human face according to a reference distance between a plurality of reflection points of the human face and an infrared sub-light source;
    the processing circuit being configured to acquire a relative position relationship between a human eye and a mobile device based on the three-dimensional image of the human face and determining whether the relative position relationship satisfies a preset result; and
    the warning circuit being configured to issue a prompt when the relative position relationship between the human eye and the mobile device satisfies the preset result.

11. The mobile device according to claim 10, wherein the preset result comprises: a distance between the human eye and the mobile device is less than a preset distance.

12. The mobile device according to claim 10, wherein the preset result comprises: an angle between the human eye and the mobile device is greater than a preset angle.

13. An eye protection method applied to a mobile device, comprising:
    obtaining a three-dimensional image of a human face according to a reference distance between a plurality of reflection points of the human face and an infrared sub-light source using a three-dimensional reconstruction method, wherein the three-dimensional reconstruction method comprises:
        emitting coherent infrared lights using a plurality of infrared sub-light sources in an infrared light source array, and different infrared sub-light sources being coherent light sources, wherein emitting the coherent infrared lights using the plurality of infrared sub-light sources in the infrared light source array comprises controlling each of the infrared sub-light sources in the infrared light source array to emit an infrared light of a preset phase such that an interference beam emitted by the coherent light sources is enhanced in a target region on a target object and weakened to be zero in a non-target region on the target object or beyond the target object;
        receiving an infrared light reflected from the target object using an infrared detector, wherein the reflected infrared light is a reflected light of the interference beam emitted by the coherent light sources;

calculating a plurality of reference distances between a reflection point on the target object and the infrared sub-light sources according to the reflected infrared light and the infrared light emitted by the infrared sub-light sources; and performing reconstruction of a three-dimensional image on the target object according to the plurality of reference distances;

acquiring a relative position relationship between a human eye and the mobile device based on the three-dimensional image of the human face; and issuing a prompt when the relative position relationship between the human eye and the mobile device satisfies a preset result.

14. The eye protection method applied to the mobile device according to claim 13, wherein the preset result comprises: a distance between the human eye and the mobile device is less than a preset distance.

15. The eye protection method applied to the mobile device according to claim 13, wherein the preset result comprises: an angle between the human eye and the mobile device is greater than a preset angle.

16. An augmented reality (AR) device, comprising a three-dimensional reconstruction system, wherein the three-dimensional reconstruction system comprises:

an infrared light source array comprising a plurality of infrared sub-light sources, and each of the infrared sub-light sources emitting an infrared light, and different infrared sub-light sources being coherent light sources;

an infrared detector configured to receive an infrared light reflected from a target object, wherein the reflected infrared light is a reflected light of an interference beam emitted by the coherent light sources;

a calculation circuit configured to calculate a plurality of reference distances between a reflection point on the target object and the infrared sub-light sources according to the reflected infrared light and the infrared light emitted by the infrared sub-light sources;

a three-dimensional reconstruction circuit configured to perform a reconstruction of a three-dimensional image on the target object according to the plurality of reference distances; and a light source control circuit configured to control each of the infrared sub-light sources to emit an infrared light of a preset phase such that the interference beam is enhanced in a target region on the target object and weakened to be zero in a non-target region on the target object or beyond the target object.

* * * * *